United States Patent
Sun et al.

(10) Patent No.: US 10,003,437 B2
(45) Date of Patent: Jun. 19, 2018

(54) WIRELESS TRANSMITTER TO OPTIMIZE THROUGHPUT BY CONTROLLING TIME-AVERAGE BLOCK SIZE OF SIGNALS TO RECEIVERS

(71) Applicant: HEWLETT-PACKARD DEVELOPMENT COMPANY, L.P., Houston, TX (US)

(72) Inventors: Yin Sun, Palo Alto, CA (US); Can Koksal, Palo Alto, CA (US); Sung-Ju Lee, Palo Alto, CA (US); Ness Shroff, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 132 days.

(21) Appl. No.: 14/760,698

(22) PCT Filed: Jan. 14, 2013

(86) PCT No.: PCT/US2013/021468
§ 371 (c)(1),
(2) Date: Jul. 13, 2015

(87) PCT Pub. No.: WO2014/109772
PCT Pub. Date: Jul. 17, 2014

(65) Prior Publication Data
US 2015/0358121 A1    Dec. 10, 2015

(51) Int. Cl.
*H04L 1/06* (2006.01)
*H04B 1/02* (2006.01)
(Continued)

(52) U.S. Cl.
CPC ............. *H04L 1/0693* (2013.01); *H04B 1/02* (2013.01); *H04B 1/06* (2013.01); *H04L 1/1887* (2013.01);
(Continued)

(58) Field of Classification Search
CPC ....... H04L 1/0693; H04L 1/1887; H04B 1/02; H04B 1/06; H04W 24/02; H04W 72/0446; H04W 72/0473; H04W 72/1242
See application file for complete search history.

(56) References Cited

U.S. PATENT DOCUMENTS 6,304,551 B1 * 10/2001 Ramamurthy ..... H04Q 11/0478
370/232
7,583,968 B2 * 9/2009 Kimura ................. H04L 1/0021
370/318
(Continued)

OTHER PUBLICATIONS

International Searching Authority, International Search Report and Written Opinion, PCT/US2013/021468, dated Oct. 25, 2013.
(Continued)

*Primary Examiner* — Ian N Moore
*Assistant Examiner* — Ronald H Davis
(74) *Attorney, Agent, or Firm* — Mahamedi Paradice LLP

(57) ABSTRACT

A prioritization is determined amongst a group of receivers for receiving signals transmitted from the wireless transmitter, without use of accurate channel state information. A signal is transmitted to each receiver based on an order that is determined by the prioritization. The transmitted signal can be encoded so that the receiver is able to receive the signal regardless of a channel state as between that receiver and the wireless transmitter.

19 Claims, 3 Drawing Sheets

(51) Int. Cl.
*H04B 1/06* (2006.01)
*H04W 72/04* (2009.01)
*H04W 24/02* (2009.01)
*H04W 72/12* (2009.01)
*H04L 1/18* (2006.01)

(52) U.S. Cl.
CPC ....... *H04W 24/02* (2013.01); *H04W 72/0446* (2013.01); *H04W 72/0473* (2013.01); *H04W 72/1242* (2013.01)

(56) References Cited

U.S. PATENT DOCUMENTS

| | | | |
|---|---|---|---|
| 7,839,851 B2 | 11/2010 | Kozat | |
| 8,203,979 B2 | 6/2012 | Zhang et al. | |
| 2006/0209813 A1 | 9/2006 | Higuchi et al. | |
| 2008/0003203 A1 | 1/2008 | Frankkila et al. | |
| 2008/0008203 A1 | 1/2008 | Frankkila et al. | |
| 2008/0125136 A1* | 5/2008 | Song | H04L 1/0002 455/452.1 |
| 2008/0159219 A1 | 7/2008 | Choi et al. | |
| 2008/0188256 A1* | 8/2008 | Wu | H04W 52/34 455/522 |
| 2009/0304117 A1* | 12/2009 | Koslov | H04L 1/0052 375/340 |
| 2009/0319855 A1 | 12/2009 | Yue et al. | |
| 2010/0157913 A1 | 6/2010 | Nagata et al. | |
| 2011/0170457 A1 | 7/2011 | Uppal et al. | |
| 2013/0195041 A1* | 8/2013 | Papasakellariou | H04W 72/042 370/329 |
| 2013/0315211 A1* | 11/2013 | Balan | H04B 7/0697 370/336 |

OTHER PUBLICATIONS

Bonello, N. et al., Reconfigurable Rateless Codes, (Research Paper), Nov. 2009, pp. 5592-5600, vol. 8, No. 11.

Chen, S. et al., Distributed Spectrum Access in Cognitive Radio Network Employing Rateless Codes, (Research Paper), Dec. 6-10, 2011, pp. 1-6.

International Searching Authority, The International Search Report and the Written Opinion, Oct. 25, 2013, PCT/US2013/021468, 14 Pgs.

Li, Y. et al., Rateless Codes for Single-server Streaming to Diverse Users, (Research Paper), Proceedings of the 47th annual Allerton conference on Communication, control, and computing, 2009, pp. 1419-1426.

Urgaonkar, R., Optimal Resource Allocation and Cross-layer Control in Cognitive and Cooperative Wireless Networks, (Research Paper), May 2011, 211 Pgs.

* cited by examiner

WIRELESS TRANSMITTER TO OPTIMIZE THROUGHPUT BY CONTROLLING TIME-AVERAGE BLOCK SIZE OF SIGNALS TO RECEIVERS

BACKGROUND

Over the past decade wireless scheduling and control techniques (e.g., opportunistic scheduling) have been developed to exploit opportunistic gains under the assumption of accurate channel state information (CSI). Some conventional approaches have used cross-layer network control with imperfect CSI that centered on fixed-rate channel codes.

DETAILED DESCRIPTION

Figure 1:
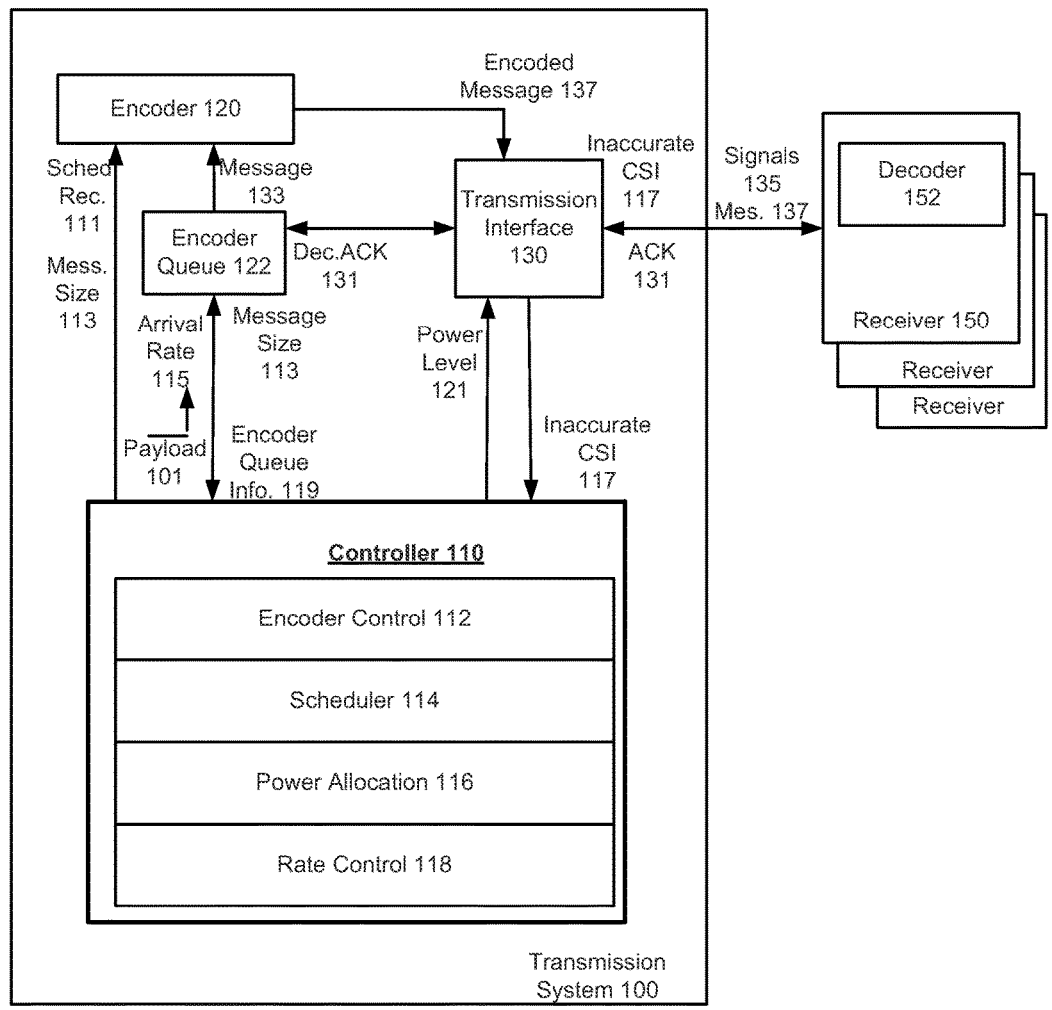
FIG. 1 illustrates an example transmitter for controlling transmissions and scheduling receivers in a time-slotted downlink cellular network.

Examples described herein include a wireless transmitter having a cross-layer controller that performs scheduling and control for transmissions of signals to receivers in a manner that optimizes throughput of the wireless transmitter. In contrast to some conventional approaches, examples described herein include a wireless transmitter that utilizes inaccurate channel state information (CSI) or even no CSI information, rather than accurate CSI, to communicate with receivers.

In an example, a wireless transmitter includes an encoder and a controller. The encoder encodes a signal corresponding to a payload to each receiver in a group of receivers in a manner that can be automatically adapted for an existing channel state as between the individual receiver and the transmitter. The controller can optimize a throughput of the wireless transmitter in transmitting the signals to the group of receivers, in-part by controlling a time-average block size for the individual signals.

In another example, a prioritization is determined amongst a group of receivers for receiving signals transmitted from the wireless transmitter. The prioritization is performed without use of accurate channel state information. A signal is transmitted to each receiver based on an order that is determined by the prioritization. The transmitted signal can be encoded so that the receiver is able to receive the signal regardless of a channel state as between that receiver and the wireless transmitter.

Accordingly, examples described herein provide for a total network utility that is within $O(1/L_{av})$ of an optimal operating point achieved by infinite block-size channel codes, where $L_{av}$ is the enforced value of the time-average block-size of rateless codes. Examples as described herein recognize that if the time-average block-size of rateless codes is large, then the decoding complexity and decoding delay are also large. On the other hand, large time-average block-size of rateless codes also provides high throughput performance. Accordingly, examples provided herein optimize throughput by forcing the time-average block-size to be fixed as $L_{av}$.

As described by some examples, a wireless transmitter can operate to trade complexity/delay for performance gains in the absence of accurate CSI. Examples described herein can improve the network throughput as compared to control schemes which use fixed-rate codes. Moreover, the feedback overhead with examples described herein can have an upper limit of $1/L_{av}$ of that for fixed-rate codes when no CSI is available at the transmitter.

Conventional wireless scheduling and control techniques (e.g., opportunistic scheduling) include processes to exploit opportunistic gains under the assumption of accurate channel state information (CSI). When the accurate CSI is available at the network controller, the data rate of channel coding can be selected such that the decoding error probability is very small and the achieved data rate is not too conservative. However, examples described herein recognize that obtaining this accurate CSI information is costly in terms of bandwidth, time, and power, and could result in incurring large overhead. Examples described herein further recognize that in practice, the network controller always has some channel uncertainty.

Moreover, examples described herein also recognize that conventional approaches which use fixed-rate channel codes to schedule and control are problematic unless CSI information is well known. In particular, under conventional approaches, when the CSI information is not perfectly known, the selected data rate for fixed-rate channel codes may be either larger than the channel capacity which results in decoding error, or smaller than the channel capacity which leads to inefficient use of available channel rates. As a result, in such conventional approaches, resultant total network utility/throughput is lower than other techniques that use accurate CSI. In contrast, examples described herein use rateless codes to deal with inaccurate CSI or even no CSI, but achieve throughput that is significantly greater than other conventional approaches that use fixed rate codes.

As used herein, the term "optimize", "optimization" and variants thereof, in the context of examples described herein, is intended to mean improving or maximizing throughput based on a specific criterion or set of criteria. Further, in examples described herein, the criterion or set of criteria includes time-averaged channel coding block size for signal transmissions to individual devices.

Wireless Transmission System

FIG. 1 illustrates an example transmitter for controlling transmissions and scheduling receivers in a time-slotted downlink cellular network. As described in greater detail, an example of FIG. 1 provides that the wireless transmission system 100 is able to signal data transmissions corresponding to a particular communication to a group of receivers 150, in a manner that optimizes throughput by controlling receiver scheduling, power allocation, and a time measured block size for individual transmissions of the communication. The throughput corresponds to an amount of data transmitted to the group of receivers 150 with regards to a payload 101. The payload 101 can include any content portion, message or other data item that is to be sent to the receivers 150 at a particular interval.

Further, with an example of FIG. 1, the transmission system 100 is able to optimize throughput without use of accurate channel state information ("CSI") provided from the individual devices. Thus, while the individual receivers 150 are able to communicate accurate CSI to the wireless transmitter, an example such as described by FIG. 1 recognizes that the communication of accurate CSI is an additional load that affects throughput of the transmission system 100. Moreover, under real-world conditions, accurate CSI is not available at all instances from each receiver 150 in the group, and the reliance on accurate CSI when such CSI is not available can further burden the efficiency of transmission system 100.

In more detail, the transmission system 100 includes a controller 110, an encoder 120, and a transmission interface 130. The transmission system 100 operates to generate encoded signals 135 for each of the receivers 150. Each signal 135 can include an encoded message 137 that carries information (or bits) corresponding the payload 101. Each receiver 150 can process the signals 135 using a corresponding decoder 152. In implementation, the receivers 150 can generate acknowledgements 131 in response to processing respective messages 137. The transmission interface 130 can record acknowledgements 131 from each receiver 150 as part of an encoder queue 122.

As described by examples, the signal 135 provided to the individual receivers 150 can be selective in each instance as to (i) the scheduled receiver, (ii) the message size of the channel codes, and (iii) the transmission power. The selection of these parameters can be based on the ability of the receiver 150 to receive information. In particular, the ability of the receiver 150 can be limited by channel state conditions. The signal 135 to each receiver 150, however, is optimized to maximize throughput (e.g., bits) while managing decoding complexity and the ability of the receiver 150, given unknown but present channel state conditions. The transmission system 100 can perform processes to schedule or prioritize receivers, as well as to optimize the amount of data carried in the signal 135 and adjust the transmission power of the signal 135 to the scheduled receiver at a given instant, without obtaining accurate CSI. Thus, among other benefits, transmission system 100 does not require use of accurate CSI, and the operation of the transmission system 100 in the absence of accurate CSI can increase the bandwidth and throughput of the wireless transmission system 100.

In an example of FIG. 1, additional optimization can also be achieved in the type of encoding used by the transmission system 100, as well as the prioritization or selection of receivers for receiving signal 135 at given instances. In particular, signal 135 can be encoded so that each device in the group of devices is able to receive the signal in a manner that is adaptable to an existing channel state as between that receiver and the transmission system 100. In this regard, the prioritization (or order) of the receivers 150 in receiving the signal 135 at individual instances can also be based on the determined ability of the individual receivers to receive information, and this determination can be made without use of accurate CSI.

In more detail, the controller 110 can implement processes and logic for scheduling and controlling signals for transmissions from the transmission system 100 in a manner that optimizes throughput, without use of accurate CSI. The encoder 120 encodes messages 133 that are output from the encoder queue 122 based on an input payload 101 (e.g., higher layer data). The output of the encoder queue 122 can include message 133, which may correspond to the payload 101. As described below, the controller 110 can signal the encoder queue 122 to control an arrival rate 115 of the payload 101. The encoder 120 operates to generate the coded message 137, corresponding to the payload 101 for communication to the individual receivers 150 of the group. The encoded message 137 can be encoded in a manner that enables the data to be received at any of multiple possible data rates, depending on an existing channel state which can affect the data rate in which the signal 135 can be received and processed. In operation, controller 110 selects an individual receiver 150 for a particular time slot. The selection of the individual receivers at given timeslots may be based on scheduling and control processes such as described below by an example of FIG. 2 or FIG. 3. The controller 110 identifies the scheduled receiver 111, and the encoder 120 generates the encoded message 137, which is communicated from the transmission interface 130 via signal 135.

The encoder 120 encodes each message 137 corresponding to the payload 101 for the individual receivers 150 in a manner that is adaptable to an existing channel state as between the receiver and transmission system 100. In one implementation, the encoder 120 signals the individual receivers 150 using hybrid automatic repeat request ("HARQ") coding. In another example, the encoder 120 signals the individual receivers 150 using rateless coding. A rateless code is composed by one to many code blocks, and each code block is transmitted in one time slot. When a receiver is scheduled, the transmitter 100 sends one code block to that receiver. The transmission of a rateless code may span over several time slots scheduled for the receiver. The selected encoding to the individual devices may require the receiver 150 to signal an acknowledgement 131 when the payload 101 is received. In one implementation, the encoder 120 generates new code blocks for a rateless channel code until the encoder receives the acknowledgement from the receiver 150. In an example of FIG. 1, the message (or payload) 133 can exit the encoder queue 122 for a particular receiver, where it is encoded by the encoder 120 as encoded message 137. The message 133 can exit the encoder queue 122 once the acknowledgement 131 is received for the prior message 137. In this regard, the acknowledgement 131 from the receivers 150 may control the output of the encoder queue 122.

Examples described herein recognize that the use of rateless codes can be implemented in the physical layer to resolve channel uncertainty (given that accurate CSI is not used). Among other benefits, the use of rateless codes for the signal 135 and encoded message 137 enables the code-rate of the encoded signal to be automatically adapted to suit the channel quality. Thus, the use of rateless codes enables the transmission system 100 to achieve high-capacity performance even when the transmitter has inaccurate or even no knowledge about the CSI. However, examples provided herein recognize that the use of rateless codes can also increase complexity and delay of channel decoding by receivers 150. To keep the decoding complexity low, the controller 110 determines time-average constraints for the block-size of rateless codes, and operates to maximize throughput subject to the time-average constraints.

In examples described herein, the controller 110 and encoder 120 combine to control the size of message 137. However, the block size and data rate of the rateless codes are controlled at the selected receiver 150 based on the channel condition. The scheduled receiver 150 can generate the acknowledgement 131 upon the receiver 150 decoding the rateless code and recovering the message 137. If the message size is larger, for example, the block size of rateless code will also be larger. Conversely, if the message size is smaller, the block size of the rateless code will also be smaller. In one implementation, the controller 110 operates to control the message size of rateless codes, in order to realize the time-average block size constraint for rateless codes. This enables the transmission system 100 to maintain moderate decoding complexity and delay while optimizing throughput.

As in greater detail below, the selection 111 of the scheduled receiver at a given instance is based on considerations that result in the optimization of the throughput of the transmission system 100. In addition to selecting a particular receiver at a given instance, controller 110 also determines control parameters corresponding to (i) a message-size 113 for the selected receiver, and (ii) the arrival rate 115 for the encoder queue 122. Controller 110 can signal the selection 111 of the scheduled receiver to the encoder 120. In this regard, the output of the encoder 120 can be controlled in part by the selection 111 of the scheduled receiver. The controller 110 can also signal the message-size 113 to the encoder 120 and the encoder queue 122. The encoder 120 generates the encoded message 137 in accordance with the control parameters identified by the controller 110. The encoded message 137 is communicated to the transmission interface 130, yielding the signal 135. The message size 113 can be communicated by the controller 110 to the encoder queue 122 and the encoder 120 in order to control a size of the message 137 communicated with the signal 135 to the selected receiver 150 at the particular instance, with an objective of maximizing overall throughput from the transmission system 100. Additionally, the evolution of the encoder queue 122 can also be determined from acknowledgements 131 received from the receivers as the signal encoding iterates through the individual receivers. The acknowledgments 131 can be received by the encoder 120 and the encoder queue 122.

With an example of FIG. 1, the controller 110 and encoder 120 can combine to communicate signal 135 (with encoded message 137) to each of the individual receivers 150 using only inaccurate CSI, and without use of accurate CSI. In variations, the controller 110 and encoder 120 combine to signal individual devices without use of any inaccurate or accurate CSI.

The controller 110 can operate iteratively, so that each receiver 150 in the group receives the signal for the payload over a duration of time. The controller 110 implements a prioritization process for selecting a particular receiver 150 at a given instance. Collectively, an example provides for the transmission system 100 to signal the payload 101 to each receiver 150 in the group in a manner that optimizes throughput.

Controller 110 can implement processes to control the encoder 120, and to make selection 111 for the receiver 150 that is to receive a particular signal for the payload at a particular instance. In examples provided herein, the controller 110 implements cross-layer processes in performing scheduling and control operations. More specifically, in an example of FIG. 1, the controller 110 includes logic corresponding to encoder control 112, scheduler 114, power allocation logic 116 and rate control logic 118. As described with examples provided below, the controller 110 can control the encoder 120 even in absence of accurate CSI. Further, as described below, the logic components of the controller can operate on multiple network layers, including the physical layer, the network layer and the MAC layer.

The encoder control 112 can implement logic to determine an optimal size for the message 137 of the encoded signal. Accordingly, the encoder queue 122 can signal the message size 113 to the encoder 120 and the encoder queue 122. The optimal value for the message size 113 can be based on an objective to increase bits in the message size, subject to decoding complexity of the signal. The larger message size yields more information, but added complexity requires time and resource from the decoder 152 of the receivers 150. In this regard, manipulation of the message size creates a tradeoff as between throughput and decoding delay. Accordingly, one control that can be implemented through the encoder control 122 is to time-average the length of the encoded signal to an average number that is relatively fixed. The number of bits included in the message for the encoded signal to each receiver 150 can be processed as a parameter that increases bits for each message subject to a constraint of decoding complexity being less than a defined threshold. In this way, the encoder control 112 controls the encoder 120 in absence of accurate CSI for the individual receivers 150. In an example, the encoder control 112 can utilize logic that is at least in part on the physical layer.

The scheduler 114 can operate to prioritize the receivers 150 so as to determine the order in which each receiver is to receive a corresponding signal 135 for payload 101. In this regard, the scheduler 114 can utilize MAC layer input and logic. In one implementation, inaccurate CSI 117 is communicated by the receivers 150 and aggregated over the transmission interface 130. The inaccurate CSI is then communicated to the controller 110. The scheduler 114 utilizes the inaccurate CSI 117 to prioritize receivers 150, and to signal selection 111 of the scheduled receiver for a particular time slot based on the prioritization. The prioritization of the receivers 150 can include prioritizing those receivers that have better channel conditions, as determined from inaccurate CSI 117. When used with, for example, rateless encoding, the prioritization enables higher bit transmissions to be handled by receivers 150 that have better channel conditions, thereby eliminating inefficiency that would otherwise result from the transmission system 100 having to retransmit or correct signal transmissions due to poor channel conditions etc.

As an addition or variation, the scheduler 114 can also signal selection 111 of the receiver 150 based on an average bit rate of individual receivers 150. The average bit rate can be determined by, for example, the controller 110, or alternatively by the transmission interface 130. The average bit rate can be inferred from, for example, encoder queue information 119, which can be determined from the encoder queue 122. The encoder queue information can identify a length of the encoder queue 122 for individual receivers 150. The length of the encoder queue 122 can also be used in prioritizing receivers 150, as those receivers with lower encoder queue lengths can be presumed to have ability for higher bit rate (and greater throughput). Accordingly, the encoder queue 122 can provide encoder queue information 119, corresponding to the queue length of the individual receiver 150. The scheduler 114 can use the encoder queue information 119 to select and/or prioritize receivers 150 (e.g., signal selection 111 of the scheduled receiver to control the encoder 120), either with inaccurate CSI 117 or without any CSI.

The power allocation logic 116 controls the amount of power used for transmitting the signal 135 to each selected receiver 150. Thus, the power allocation logic 116 can be based primarily on the receiver 150 that is selected to receive the signal for the payload 101 at a particular instance. In an example, the power allocation logic 116 can utilize physical layer input. In one example, the power allocation logic 116 can implement logic for implementing Equation (15), as described with an example of FIG. 3. A specific power output level 121 can be communicated in connection with each signal 135 transmitted to a particular receiver. The power output level 121 can be communicated from the controller 110 to the transmission interface 130, or alternatively, provided through the encoder 120.

The rate control logic 118 can operate to control the arrival rate in which the encoder queue receives bits for communication to individual receivers 150. If, for example, the selected rate for a particular receiver is larger than what the receiver can efficiently handle, the length of the encoder queue 122 becomes large. When the queue length (as indicated by the encoder queue information 119) is above a threshold (e.g., predetermined or based on average or experimental values), then the rate control logic 118 signals to decrease the arrival rate for that receiver 150 until, over time, the queue length of the encoder queue 122 is below the threshold. In one example, rate control logic 118 can utilize network layer information, and implement logic for implementing Equation (16), as described with an example of FIG. 3.

Additionally, the controller 110 can iteratively update the various control parameters based on acknowledgements 131 received from the individual receivers 150. In this way, the controller 110 can iteratively communicate payload 101 to various receivers 150 through scheduling and control of individual receivers at individual instances of time.

Methodology

Figure 2:
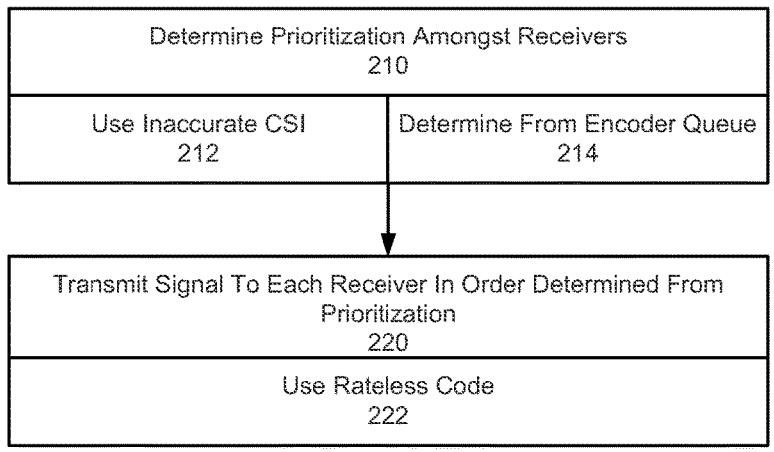
FIG. 2 is an example method for controlling a wireless transmitter to optimize throughput without use of accurate CSI.
Figure 3:
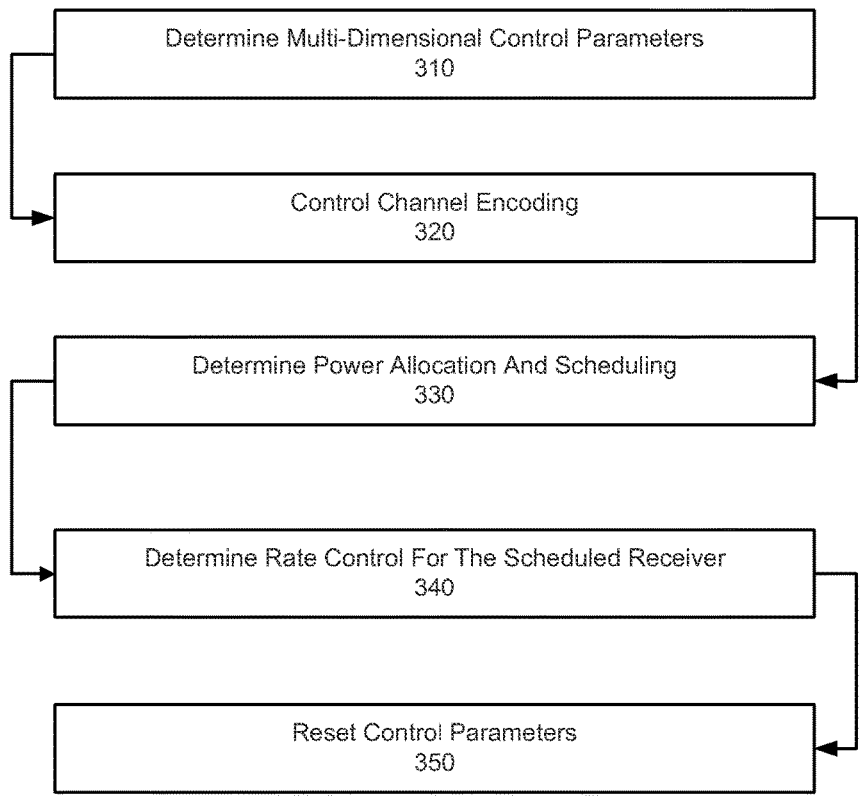
FIG. 3 is an example method for controlling a wireless transmitter to optimize throughput without use of accurate CSI in the context of a network model.

FIG. 2 is an example method for controlling a wireless transmitter to optimize throughput without use of accurate CSI. FIG. 3 is an example method for controlling a wireless transmitter to optimize throughput without use of accurate CSI in the context of a specific network model. A method such as described with an example of FIG. 2 or FIG. 3 can be implemented using, for example, a wireless transmission system such as described with an example of FIG. 1. Accordingly, reference may be made to elements of FIG. 1 for purpose of illustrating suitable components or elements for performing a step or sub-step being described.

With reference to FIG. 2, prioritization is determined amongst receives that communicate with a wireless transmission system (210). In one example, the controller 110 of wireless transmission system 100 prioritizes receivers in terms of determining an order in which individual receivers 150 are to receive the signal 135 corresponding to a code block of the payload 101. The prioritization is based on an objective to maximize a throughput of the wireless transmission system 100. The prioritization can be based at least in part on a determination as to a bit rate that an individual receiver of the group can receive the message 137 of signal 135 at a particular instance. However, examples described herein can prioritize receivers based on determined data rates without use of accurate CSI.

In determining the prioritization, the controller 110 may use inaccurate CSI (212). The inaccurate CSI can be acquired at a significantly less expense than accurate CSI. As an addition or variation, the controller 110 can base its determination from an encoder queue 122 associated with a particular receiver (214). In particular, a size of an encoder queue can be determinative of the data rate that can be handled by the receiver.

The controller 110 transmits the signal corresponding to each receiver in an order that is determined from the prioritization (220). In transmitting the signals, the encoder 120 can implement a rateless code, or other encoding that can automatically adapt code-rate to channel quality during the transmission (222).

Network Model Example

An example method such as described by FIG. 3 can be implemented for a network model that assumes a time-slotted downlink cellular network with one transmitter and S receivers. Thus, an example of FIG. 3 can be implemented by, for example, a system such as described with FIG. 1, when implemented at, for example, a base station or other wireless transmission point. In an example of FIG. 3, a network model may be determined in which channels are assumed to (i) be block fading with a constant channel state within each slot, and (ii) vary from one slot to another. The channel states of slot t can be described as $h[t]=(h1[t], \ldots, hS[t])$, and each receiver can be assumed to have perfect knowledge of its own CSI via channel estimation. However, an assumption can also be made that a transmitter only has access to an imperfect CSI due to channel fluctuation and limited feedback.

In such a network model, P[t] denotes the transmission power in slot t. The downlink transmissions are subject to a peak power constraint $$0 \leq P[t] \leq P_{peak}, \quad \text{(Equation 1)}$$

for all t and a time-average power constraint $$\limsup_{T \to \infty} \frac{1}{T} \sum_{t=0}^{T-1} P[t] \leq P_{av}. \quad \text{(Equation 2)}$$

Under the network model, the mutual information accumulated at receiver s is denoted by I(hs, P). For purpose of the model, the assumption can be made that I(hs, P) is a non-decreasing and concave function of P, and that there exists some finite Imax, C>0 such that:

$$I(h_s, 0) = 0, I(h_s, P_{peak}) \leq I_{max}, \quad (w.p. 1) \quad \text{(Equation 3)}$$

$$\left. \frac{\partial E_h\{I(h_s, P) | \hat{h}_s\}}{\partial P} \right|_{P=0} \leq C, \forall \hat{h}_s$$

where w.p.1 stands for "with probability 1", the expectation Eh is taken over the channel state h and the upper bound Imax is due to the limited dynamic range of practical RF receivers.

In rateless coding, the transmitter can generate a theoretical unlimited amount of coded packets from a given size of message bits. In each slot, the transmitter sends a coded packet with K symbols to a scheduled receiver. Each receiver (s) can record the mutual information (I) during its reception slots. Once the sum of the recorded mutual information exceeds a pre-determined threshold, the receiver can decode the message and send an acknowledgement (e.g., 1 bit ACK) back to the transmitter. The transmitter then stops sending the remaining packets of the current rateless code and starts to transmit the next message.

The block-size of the rateless code associated with a message is variable and depends on the amount of mutual information accumulated in each slot a receiver is scheduled. Each receiver maintains a decoder queue Rs[t], which represents the remaining amount of mutual information that is still required to successfully decode the current message. Once Rs[t] becomes smaller than or equal to I(hs[t], P[t])K, receiver s can decode the current message at the end of slot t and get prepared for the next message. Let ns[t] denote the index of the current rateless code of receiver s, and c[t]=denote the scheduled receiver in slot t. The evolution of the decoder queue Rs[t] can be determined by:

$$R_s[t+1] = \begin{cases} R_s[t], & \text{if } c[t] \neq s, \\ R_s[t] - I(h_s[t], P[t])K, & \text{if } c[t] = s \text{ and} \\ & R_s[t] > I(h_s[t], P[t])K, \\ (1+\varepsilon)M_s[n_s[t]+1], & \text{if } c[t] = s \text{ and} \\ & R_s[t] \leq I(h_s[t], P[t])K, \end{cases}$$ (Equation 4)

where Ms[n] is the size of the message bits for the nth rateless code of receiver s, K is the number of symbols in each packet, and c is the overhead rate for achieving a sufficiently small decoding error probability.

Since the transmitter can be assumed to have no access to the decoder queue Rs[t], the transmission system 100 updates the encoder queue Qs[t] only based on the ACK events. An ACK variable (a[t]) can be defined by:

if c[t]=s and Rs[t]≤I(hs[t], P[t])K, receiver s can decode the current rateless code and send an ACK to the transmitter, and a[t]=s;

if the transmitter receives no ACK in slot t, then a[t]=0.

The Qs[t] can represent the encoder queue for individual receivers. The evolutions of the encoder queue Qs[t] can be described in one example as:

$$Q_s[t+1] = (Q_s[t] - M_s[n_s[t]]1_{\{a[t]=s\}})^+ + x_s[t],$$ (Equation 5)

where $1_{\{A\}}$ is the indicator function of some event A, $(\cdot)^+ = \max\{\cdot, 0\}$, and $x_s[t]$ is the arrival rate of the encoder queue.

The arrival rate can be bounded by 023 $x_s[t] \leq D_s$.

The code index ns[t], which can be available to both transmitter and receiver, can be evolved as described with:

$$n_s[t+1] = n_s[t] + 1_{\{a[t]=s\}}$$ (Equation 6)

In this model, decoding complexity can be determined as follows. If tn,s=min{t≥0:ns[t]=n} is defined as the time slot that the first packet of the nth rateless code for receiver s is transmitted, then the block-size of the nth rateless code for receiver s can be provided as:

Equation (7)

$$L_s[n] = \min\left\{\sum_{t=t_{n,s}}^{t_{n,s}+l-1} 1_{\{c[t]=s\}} : M_s[n] \leq \sum_{t=t_{n,s}}^{t_{n,s}+l-1} 1_{\{c[t]=s\}} I(h_s[t], P[t])K, l \geq 1\right\}$$

Examples recognize that the block-size Ls[n] can have a significant influence on the decoding time of rateless codes over time-varying noisy channels. Accordingly, an objective can be made to limit Ls[n] so as to maintain an acceptable decoding complexity. However, an example further recognizes that Ls[n] cannot be specified before transmission, because the assumption is that accurate channel states information for future slots are not available. In particular, the set of possible values for Ls[n] may have an infinite span depending on, for example, the stochastic model of the wireless channel states.

Accordingly, an example such as described avoids the occurrence of undesirably long block-sizes, and further effectively controls the decoding complexity, using time-average block-size constraint. Examples of such time-average block-size constraints include:

$$\lim_{N\to\infty} \frac{1}{N}\sum_{n=1}^{N} L_s[n] = L_{av}$$ (Equation 8)

for $L_{av} \geq 1$ and all $s \in \{1, \ldots, S\}$

In an example of FIG. 3, multi-dimensional control parameters are defined for the time-averaged constraints (310). In one example, a control parameter (Z) for the time-average power constraint is defined as follows:

$$Z[t+1] = (Z[t] - P_{av})^+ + P[t]$$ Equation (9)

where $$\limsup_{T\to\infty} \frac{1}{T}\sum_{t=0}^{T-1} P[t] \leq P_{av}.$$ Equation (10)

Additionally, a control parameter (Ws) for the time-averaged block-size constraint for receiver s can be defined as follows:

$$Ws[n+1] = Ws[n] + Ls[n] - L_{av}$$ Equation (11)

where $$\lim_{N\to\infty} \frac{1}{N}\sum_{n=1}^{N} L_s[n] = L_{av}.$$ Equation (12)

Channel encoding is controlled in accordance with an objective to maximize throughput, while minimizing the required decoding complexity (320). Accordingly, an example provides for implementing low-complexity encoding control that increases the message size of rateless codes based on the control parameter Ws as follows:

Increase Ms[n], if Ws[n]≥0; and

Decrease Ms[n], if Ws[n]<0.

In the example, the message size Ms[n] is given by:

$$M_s[n+1] = \begin{cases} (M_s[n] - \delta)^+, & \text{if } W_s[n] \geq 0, \\ \min\{M_s[n] + \delta, M_{max}\}, & \text{if } W_s[n] < 0, \end{cases}$$ Equation (13)

where δ>0 and $M_{max} = I_{max}LK$ are parameters. Equation 13 thus determines the number of bits that are included in a message block of transmission. The control parameter Ws for the channel encoding is thus determinative of the message size (or number of bits included in the message block), and ensures the code length of the determined rateless code is optimal in relation to throughput for the network.

Further in the example of FIG. 3, power allocation and scheduling is determined (330) in prioritizing receivers for transmissions. In each time block, a determination can be made as to which receiver s to transmit to, and further how much power should be used in transmitting to the particular receiver. In one implementation, inaccurate channel state information is used to select a priority of receivers to receive the message block. The inaccurate channel state information can prioritize users based on a qualitative determination as to which receivers have better channel state information. Receivers with better channel conditions can be prioritized and scheduled for transmissions with higher bit rates, based on an assumption that users with better channel state information can receive data transmissions with a higher bit rate than a receiver with lesser channel state information.

In one example, the selection of the scheduled receiver is represented by:

$$c[t] = (\arg\max_{s \in \{1, \ldots, S\}}) Q_s[t] E_h\{I(h_s[t], P_s[t])\hat{h}_s[t]\}K - Z[t]P_s[t],$$ Equation (14)

where Ps[t] is given by:

$$P_s[t] = \underset{P \in [0, P_{peak}]}{\operatorname{argmax}} Q_s[t] E_h \{ I(h_s[t], P) \mid \hat{h}_s[t] \} K - Z[t] P. \quad \text{Equation (15)}$$

The inaccurate channel state information (or CSI) that is known to the transmitter can be represented for the various receivers by $h_s(t)$.

In one example, the average bit rate for individual receivers can also be determined. The average bit rate can be determined from the encoder queue for each receiver Qs[t], with the understanding that receivers that are receiving higher bit rates have larger encoder queue lengths Qs[t].

Rate control can be determined for the scheduled receiver (340). The rate control determines the arrival rate of encoder queue corresponding to the individual receiver. The rate control determination can be based in part on the encoder queue length Qs[t] for individual receivers. The encoder queue length Qs[t] indicates what bit rate the receiver can handle. For example, high queue length (or large Qs[t]) is indicative of receivers that are unable to receive transmissions at high arrival rates, and need lower arrival rate. In one example, the queue length Qs[t] is correlated to an arrival rate, which for the encoder queue can be represented as:

$$x_s[t] = \underset{x \in (0, D_X]}{\operatorname{argmax}} V U_s(x) - x^2 - 2 Q_s[t] x, \quad \text{Equation (16)}$$

where V>0 is a constant parameter.

Once the receiver is scheduled, the parameters for controlling the transmission are reset (350). A process described with (310)-(350) is repeated whenever the encoder queues are not empty and contain payload data. An example method of FIG. 3 can be repeated for subsequent time periods.

Wireless Transmitter

Figure 4:
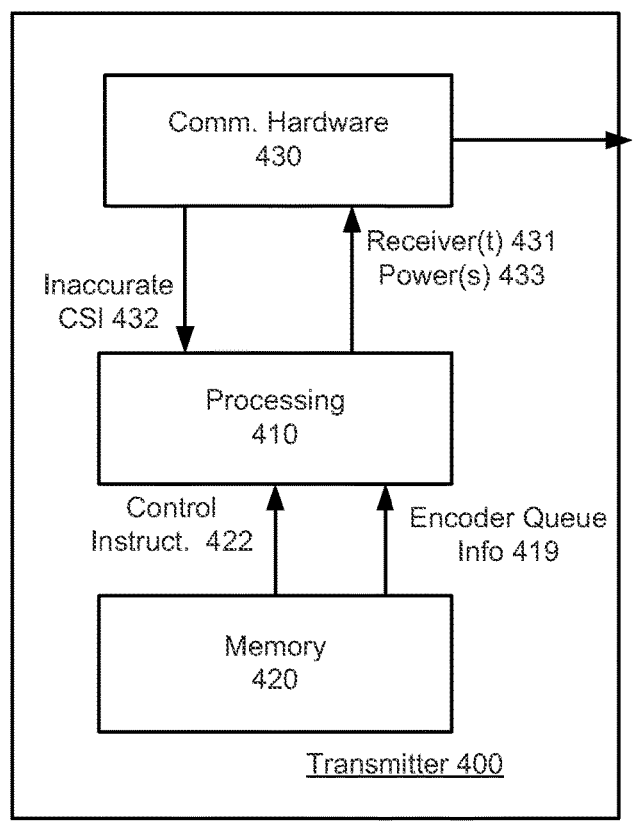
FIG. 4 illustrates an example transmitter to schedule and control signal transmissions to receivers.

FIG. 4 illustrates an example transmitter to schedule and control signal transmissions to receivers. A transmitter 400 can operate as part of a time-slotted cellular network. The transmitter 400 includes processing resources 410, memory resource 420 and communication hardware 430. The communication hardware 430 can include various hardware resources for enabling signal transmissions and other physical layer functionality. The memory resource 420 includes non-transitory storage mediums that store data and instructions for implementing processes and operations described with examples of FIG. 1 through FIG. 3. The processing resources 410 can implement higher level functions of transmission system 100, including algorithms for controlling the communication hardware 430 in communicating wireless signals to a group of receivers (not shown in FIG. 4). The memory resource 420 can store the payload data in the encoder queue and instructions ("control instructions 422") for enabling the processor 410 to implement higher level communication functionality, as well as the control processes and algorithms.

In an example, the processing resource 410 operates to implement scheduling and control processes such as described with examples of FIG. 2 and FIG. 3. In operation, the processing resource 410 receives inaccurate CSI 432 from the communication hardware 430, which can ping or otherwise analyze communication channel information with individual receivers of the transmitter. The processing resource 410 can control the communication hardware 430 by providing a receiver selection 431 at a given instance to receive the signal transmission based on optimization considerations. For each receiver selection 431, the processing resource 410 can use the control instructions 422 to determine a power allocation 433 for the selected receiver. Additionally, the encoder queue can be provided with memory resource 420. Encoder queue information 419 can be used to determine an arrival rate for the encoder queue, from which other determinations such as the scheduled receiver 431 can be determined. In this way, the processor 410 can schedule receivers to receive transmission signals corresponding to a payload in a manner that optimizes a throughput of the transmitter 400.

Although illustrative examples have been described in detail herein with reference to the accompanying drawings, variations to specific examples are also encompassed by this disclosure. It is contemplated that a particular feature described, either individually or as part of an example, can be combined with other individually described features, or parts of other examples.

What is claimed is:

1. A wireless transmitter comprising:
an encoder to generate signals for communicating a payload to a group of receivers, the encoder encoding each signal corresponding to the payload so that a receiver in the group of receivers is able to adaptively receive the signal regardless of a channel state between the receiver and the wireless transmitter, wherein the signals are message outputs from an encoder queue and the message output is based on the payload; and
a controller, including a rate control logic, the controller to alter a throughput of the wireless transmitter transmitting the signals to the group of receivers by signaling the rate control logic to determine an encoder queue length, and by utilizing a time-average block size constraint for the individual signals based at least in part on the rate control logic determining an arrival rate of the payload to the encoder queue, wherein the encoder queue length is determined by a threshold for a particular receiver in the group of receivers, without use of channel state information for the group of receivers.

2. The wireless transmitter of claim 1, wherein the signal is encoded as a hybrid automatic repeat request (HARQ).

3. The wireless transmitter of claim 1, wherein the signal is encoded as a rateless code.

4. The wireless transmitter of claim 1, wherein the controller controls the time-average block size for the signal by scheduling a receiver to receive the signal at a particular instance, based at least in part on a determination as the arrival rate for the encoder queue provided with the encoder.

5. The wireless transmitter of claim 4, wherein the controller schedules the receiver by obtaining inaccurate channel state information from one or more receivers of the group, and uses the inaccurate channel state information to determine a data rate in which each of the one or more receivers are able to receive the signal.

6. The wireless transmitter of claim 4, wherein the controller determines power allocation for transmitting a signal to each scheduled receiver.

7. The wireless transmitter of claim 1, wherein the controller implements cross-layer logic to alter the throughput.

8. The wireless transceiver of claim 1, wherein the controller is to alter the throughput based on a prioritization of a receiver of the group of receivers by an average bit rate of the receiver.

9. A method for controlling a wireless transmitter, the method comprising:
    determining a prioritization amongst a group of receivers for receiving signals transmitted from the wireless transmitter, without use of channel state information and based on a controller, including a rate control logic, and an encoder queue, to control an arrival rate of a signal in response the rate control logic receiving a signal from the controller to determine an encoder queue length, and an alteration of a throughput of the wireless transmitter to the group of receivers, wherein the encoder queue length is determined by a threshold for a particular receiver in the group of receivers; and
    transmitting the signal to each receiver based on an order that is determined by the prioritization, wherein the signal is a message output from the encoder queue and the message output is based on the payload, and transmitting the signal includes encoding the signal so that the receiver is able to receive the signal regardless of a channel state between the receiver and the wireless transmitter.

10. The method of claim 9, wherein encoding the signal includes encoding the signal in a rateless code.

11. The method of claim 9, wherein determining the prioritization is based on inaccurate channel state information for one or more of the receivers of the group.

12. The method of claim 9, wherein determining the prioritization is based on a transmission queue for one or more of the receivers of the group.

13. The method of claim 9, further comprising determining a power allocation for transmitting the signal to each receiver in the group.

14. The method of claim 9, further comprising determining the arrival rate for the encoder queue for transmitting the signal to each receiver in the group.

15. The method of claim 9, wherein the alteration of the throughput is based on enforcing a time-averaged block size for transmitting the signal to each receiver.

16. A wireless transmitter comprising:
    communication hardware for transmitting signals as part of a downlink cellular network;
    a memory resource to store a set of instructions; and
    a processing resource to use the set of instructions to transmit signals to a set of receivers using the communication hardware, the processing resource performing operations that include:
        determine a prioritization amongst a group of receivers for receiving signals transmitted from the wireless transmitter, without use of channel state information and based on an alteration of a throughput by a controller including a rate control logic, and an encoder queue, controlling an arrival rate of a signal in response the rate control logic receiving a signal from the controller to determine an encoder queue length, wherein the signals are message outputs from an encoder queue and the rate of message output and wherein the encoder queue length is determined by a threshold for a particular receiver in the group of receivers; and
        transmit the signal to each receiver determined by the prioritization, wherein the signal is a message output from the encoder queue and the message output is based on the payload, and transmitting the signal includes encoding the signal so that the receiver is able to receive the signal regardless of a channel state as between the receiver and the wireless transmitter.

17. The wireless transmitter of claim 16, wherein the operations of the processing resource operate on multiple network layers selected from a group consisting of a physical layer, a network later, and a MAC layer.

18. The wireless transmitter of claim 16, wherein the operation to transmit the signal is based on a time-average block size for the signal that the wireless transmitter determines based on a threshold of decoding complexity and without use of accurate channel state information.

19. The wireless transmitter of claim 16, wherein the operation to determine a prioritization is based on an average bit rate of each receiver of the group.

* * * * *